Patented Aug. 3, 1948

2,446,165

UNITED STATES PATENT OFFICE 2,446,165

PROCESS FOR PREPARING p-QUINONE DIOXIME

Joseph H. Trepagnier, Wilmington, Del., assignor to E. I. du Pont de Nemours & Company, Wilmington, Del., a corporation of Delaware No Drawing. Application November 14, 1945, Serial No. 628,671

3 Claims. (Cl. 260—396)

This invention relates to an improvement in the process for preparing p-quinone dioxime.

Insofar as I have been able to determine, the methods heretofore used for the preparation of p-quinone dioxime are based on work of Nietzki and Guiterman [Berichte 21, 428 (1888)] wherein one mol of p-nitrosophenol is reacted at room temperature with one mol of hydroxylamine hydrochloride and one mol of hydrochloric acid. This reaction requires from six to eight days for completion, and the yields of the desired p-quinone dioxime are very poor, being less than 40% of theory, based on the phenol used. Although subsequent to this original work several others have studied the reaction, they made no marked improvement. While Lobry de Bruyn [Recueil 13, 109 (1894)] obtained a somewhat higher yield, the process he employed is too involved for general commercial use. As recently as 1938 Ruggli and Petitjean (Helvetica Chimica Acta 21, 723) again employed the procedure of Nietzki and Guiterman to obtain the p-quinone dioxime, apparently in the absence of a better process.

The disadvantages of employing a reaction which requires from six to eight days to bring to completion, insofar as commercial operation of such process is concerned, are obvious. When an attempt was made to recrease the time of reaction by increasing the temperature, a product was obtained which was very impure, being dark in color and having a lower decomposition point than p-quinone dioxime. Such impure p-quinone dioxime is generally unsuitable for the preparation of compounds such as p-dinitrosobenzene, and it has been impossible by reasonably simple purification methods to obtain a satisfactory product. Purification of such crude material by more involved recrystallization, materially reduces the yield of p-quinone dioxime.

It is an object of this invention to provide an improved process for producing p-quinone dioxime in good yields and of a quality that is satisfactory for use in the preparation of other compounds such as p-dinitrosobenzene. It is a further object of the invention to produce p-quinone dioxime in good yields and of high purity, by a process that can be carried out in relatively short periods of time.

I have found that p-nitrosophenol can be reacted at slightly elevated temperatures with a hydroxylamine salt to give a relatively high yield of p-quinone dioxime of good quality in a reasonably short reaction time, provided the reaction mass initially contains only a very small amount of free acid, preferably no more than arises from the hydrolysis of a neutral hydroxylamine salt of a strong mineral acid such as hydroxylamine hydrochloride. Where the hydroxylamine hydrochloride is used, the reaction is carried out without the addition of any free acid, while with the use of acid salts such as the hydroxylamine acid sulfate, the free acid must be neutralized or reduced to a point where very little free acid remains. Because the p-nitrosophenol is not stable in alkaline solutions, care must be taken in reducing the amount of free acid in the solution that it does not become alkaline. For this reason, the solution should be allowed to remain slightly acid, preferably with a pH of from 2 to 5, inclusive.

The following examples are given to illustrate the invention. Parts used are by weight, unless otherwise specified.

EXAMPLE 1

To illustrate the beneficial effect of carrying out the reaction with no excess mineral acid at the beginning, the following series of reactions was carried out. A solution of 38.2 parts of hydroxylamine hydrochloride in 350 parts of water was mixed at 65° C. with 72.8 parts of p-nitrosophenol crystals (containing 61.5 parts of p-nitrosophenol) and stirred at 65° C. for the length of time indicated in the following table. Prior to heating, the solution had an initial pH of about 3.75 in each case. At the end of this time, 400 parts of chipped ice were added to the reaction mixture and 30% of sodium hydroxide solution added until pH 7.5 was reached. At this pH, p-nitrosophenol is soluble while p-quinone dioxime is not, so that an efficient separation of the two can be made. The reaction mixture was then filtered and the filter cake washed alkali-free with water and dried at 65° C. The purity of the product was determined by extracting the filter cake with a large volume of hot water which dissolves the quinone dioxime, leaving the insoluble impurities. Another series of reactions was carried out similarly to those above, except that 50 parts of the water used was replaced by 60 parts of 33.3% hydrochloric acid (one mol of hydrochloric acid per mol of hydroxylamine hydrochloride as recommended in the literature).

As illustrated in Table I, the omission of the excess hydrochloric acid results in high yields of p-quinone dioxime of high purity. On the other hand, when the reaction is carried out in the presence of excess hydrochloric acid, the purity of the product rapidly decreases with increasing reaction time. It should be noted that, as previously pointed out, the impure samples so obtained cannot be purified by any known simple procedure such as by dissolving in dilute sodium hydroxide solution and reprecipitating with acid.

The purity of the dioxime given in the following tables is determined by extracting the product with hot water, leaving behind the insoluble impurities. In this determination, any excess soluble nitrosophenol has been removed, as pointed out above, prior to the hot water extraction. The purity of the product given in these tables is therefore 100 minus the percentage of hot water insoluble material found, and the "yield of dioxime" is the crude product yield multiplied by this purity in per cent. No method for determining absolute purity of the p-quinone dioxime has been perfected, for the melting point of this product is indefinite and an elementary analysis does not distinguish it from impurities which may be present therein.

*Table I*

| Mols HCl Added per Mol HONH$_2$·HCl | Reaction Time in Hours | Color of Product | Yield of Crude | Purity of Crude | Yield Pure p-Quinone Dioxime |
|---|---|---|---|---|---|
| | | | Per cent | Per cent | Per cent |
| None | 0.75 | Light brown | 53 | 99 | 52 |
| Do | 1.5 | Light gray-brown | 75 | 99 | 74 |
| Do | 2.5 | ___do___ | 89 | 99 | 88 |
| One | 0.75 | Very dark gray-brown | 45 | 94 | 42 |
| Do | 1.5 | Black | 64 | 81 | 52 |
| Do | 2.5 | ___do___ | 80 | 70 | 56 |

EXAMPLE 2

Acid salts of hydroxylamine may be used in the process, for, by neutralizing the excess acid, a good quality p-quinone dioxime can be obtained in good yields. This is illustrated by the following. A solution of 75 parts of hydroxylammonium acid sulfate in 359 parts of water was partially neutralized by adding 30% sodium hydroxide solution until the solution was just slightly acid to Congo red paper, corresponding to a pH of about 4.5. This solution was then heated to the temperature given in Table II, and 72.8 parts of moist p-nitrosophenol crystals containing 61.5 parts of p-nitrosophenol were added. The mixture was stirred for the indicated length of time, cooled, and each product isolated by the method used in Example 1. A corresponding set of reactions was also run without neutralizing the hydroxyl-ammonium acid sulfate. The results are given in Table II.

*Table II*

| Acid Condition | Reaction Time in Hours | Reaction Temperature | Yield Crude | Purity Crude | Yield Pure p-Quinone Dioxime |
|---|---|---|---|---|---|
| | | °C. | Per cent | Per cent | Per cent |
| Not neutralized | 3.5 | 70 | 87 | 89 | 77 |
| Neutralized | 3.5 | 70 | 94 | 98 | 92 |
| Not neutralized | 0.5 | 95 | 78 | 68 | 53 |
| Neutralized | 0.5 | 95 | 91 | 96 | 87 |

Results similar to those obtained above can be obtained by neutralizing the hydroxylammonium acid sulfate solution immediately after the p-nitrosophenol has been added.

Other bases or alkaline salts may be used to neutralize the hydroxylamine acid sulfate, such as sodium acetate, potassium hydroxide, sodium carbonate etc.

It is of course understood that other water soluble salts of hydroxylamine may be employed in carrying out this invention. The amount of hydroxylamine salt used is that containing from 1 to 1.25 mols of the hydroxylamine per mol of p-nitrosophenol. While larger amounts of the hydroxylamine salt may be used, no particular advantage is obtained. The reaction may be carried out using somewhat less than theory of the hydroxylamine salt, although this tends to give a p-quinone dioxime of poorer quality unless the reaction time is carefully controlled. The reaction is preferably carried out at temperatures of from 55° to 95° C. and under conditions where practically no free acid initially exists. As pointed out above, a slight excess of mineral acid can be tolerated at the start of the reaction, and the amount of the excess will depend upon the volume and temperature of the reaction. It has been found that for uniformly good results the initial acidity of the solution should be reduced to a pH of from 2 to 5, inclusive, or, in other words, it should be slightly acid or substantially neutral to Congo red indicator. The reaction is conveniently carried out in from 3 to 20 parts of water per part of p-nitrosophenol.

This invention provides a process for preparing p-quinone dioxime in high yields and purity and in a relatively short reaction time.

I claim:

1. In the process for preparing p-quinone dioxime wherein one mol of p-nitrosophenol is reacted with approximately one mol of hydroxylamine in the form of a water soluble salt in from 3 to 20 parts of water per part of p-nitrosophenol at temperatures of from 55° to 95° C., the step which comprises carrying out the reaction in a solution of the hydroxylamine salt which initially has a pH of from 2 to 5, inclusive.

2. In the process for preparing p-quinone dioxime wherein one mol of p-nitrosophenol is reacted with approximately one mol of hydroxylamine hydrochloride in from 3 to 20 parts of water per part of p-nitrosophenol at temperatures of from 55° to 95° C., the step which comprises carrying out the reaction in a solution of the hydroxylamine hydrochloride which initially has a pH of from 2 to 5, inclusive.

3. In the process for preparing p-quinone dioxime wherein one mol of p-nitrosophenol is reacted with approximately one mol of hydroxylamine in the form of its sulfate in from 3 to 20 parts of water per part of p-nitrosophenol at temperatures of from 55° to 95° C., the step which comprises carrying out the reaction in a solution of the hydroxylamine sulfate which initially has a pH of from 2 to 5, inclusive.

JOSEPH H. TREPAGNIER.

REFERENCES CITED

The following references are of record in the file of this patent:

Nietzki et al., Berichte, 21, pages 428–434 (1888).